United States Patent
Philpott (10) Patent No.: US 11,608,045 B2
(45) Date of Patent: Mar. 21, 2023

(54) SYSTEM AND METHOD OF CHECKING SEALING OF A BRAKE CALIPER HOUSING

(71) Applicant: ArvinMeritor Technology, LLC, Troy, MI (US)

(72) Inventor: Daniel Philpott, Goodrich, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 178 days.

(21) Appl. No.: 17/023,102

(22) Filed: Sep. 16, 2020

(65) Prior Publication Data

US 2022/0080940 A1  Mar. 17, 2022

(51) Int. Cl.
*B60T 17/22* (2006.01)
*G01M 3/32* (2006.01)
*G01M 3/22* (2006.01)

(52) U.S. Cl.
CPC .......... *B60T 17/221* (2013.01); *G01M 3/226* (2013.01); *G01M 3/3236* (2013.01)

(58) Field of Classification Search
CPC ..... B60T 17/22; B60T 17/221; G01M 3/3236
See application file for complete search history.

(56) References Cited

U.S. PATENT DOCUMENTS

| | | |
|---|---|---|
| 4,491,203 A | 1/1985 | Monick |
| 4,620,617 A | 11/1986 | Weber |
| 4,690,253 A | 9/1987 | Weber |
| 4,958,654 A | 9/1990 | Hoffman, Jr. et al. |
| 6,276,494 B1 | 8/2001 | Ward et al. |
| 6,354,407 B1 | 3/2002 | Heinlein et al. |
| 6,607,059 B1 | 8/2003 | Kapaan et al. |
| 6,659,236 B1 | 12/2003 | Clark et al. |
| 6,691,837 B1 | 2/2004 | Kapaan et al. |
| 8,191,691 B2* | 6/2012 | Gelb .................. F16D 65/0031 188/71.6 |
| 9,599,177 B2 | 3/2017 | Yasui et al. |
| 2003/0085082 A1 | 5/2003 | Severinsson et al. |
| 2003/0173164 A1 | 9/2003 | Angerfors |
| 2005/0284709 A1 | 12/2005 | Sandberg |
| 2012/0325596 A1 | 12/2012 | Malki et al. |
| 2013/0008749 A1 | 1/2013 | Sandberg et al. |
| 2013/0256076 A1 | 10/2013 | Malki et al. |
| 2015/0354645 A1 | 12/2015 | Cann |
| 2019/0001950 A1 | 1/2019 | Bourlon |
| 2019/0024740 A1 | 1/2019 | Taylor et al. |
| 2019/0024742 A1 | 1/2019 | Taylor |

(Continued)

FOREIGN PATENT DOCUMENTS

| | | |
|---|---|---|
| CN | 101871835 A1 | 10/2010 |
| DE | 102008037774 B3 | 2/2010 |

(Continued)

OTHER PUBLICATIONS

European Patent Office, European Search Report for corresponding European Application No. 21196821.9-1012, dated Feb. 11, 2022.

*Primary Examiner* — Erika J. Villaluna
(74) *Attorney, Agent, or Firm* — Brooks Kushman PC (57) ABSTRACT

A system and method of checking sealing of a brake caliper housing. The method may include determining a level of moisture in a cavity of a brake caliper housing with a sensor. In another configuration, the method may determine whether a detected pressure inside the cavity remains stable for a predetermined period of time.

20 Claims, 8 Drawing Sheets

(56) References Cited

U.S. PATENT DOCUMENTS

2019/0063530 A1   2/2019  Kulkarni et al.
2019/0331181 A1  10/2019  Kulkarni et al.
2019/0331184 A1  10/2019  Taylor et al.
2019/0331185 A1  10/2019  Shah et al.

FOREIGN PATENT DOCUMENTS

DE   102018121859  A1   3/2020
EP       0190453  A2   8/1986
GB       2474301  A    4/2011

* cited by examiner

SYSTEM AND METHOD OF CHECKING SEALING OF A BRAKE CALIPER HOUSING

TECHNICAL FIELD

This document relates to a system and method of checking sealing of a brake caliper housing.

BACKGROUND

A brake assembly is disclosed in U.S. Patent Publication No. 2019/0024740.

SUMMARY

In at least one embodiment, a method of checking sealing of a brake caliper housing is provided. The method may include providing a sensor that is in fluid communication with a cavity of the brake caliper housing. A level of moisture in the cavity may be determined with the sensor.

In at least one embodiment, a method of checking sealing of a brake caliper housing may be provided. The method may include providing a brake caliper housing. The brake caliper housing may have a cavity, a through hole that extends from the cavity, and a fitting that may be received in the through hole and that may be fluidly connected to the cavity. A pressure of fluid inside the cavity may be changed via the fitting. The pressure inside the cavity may be detected after changing the pressure. The method may include determining whether the detected pressure remains stable for a predetermined period of time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
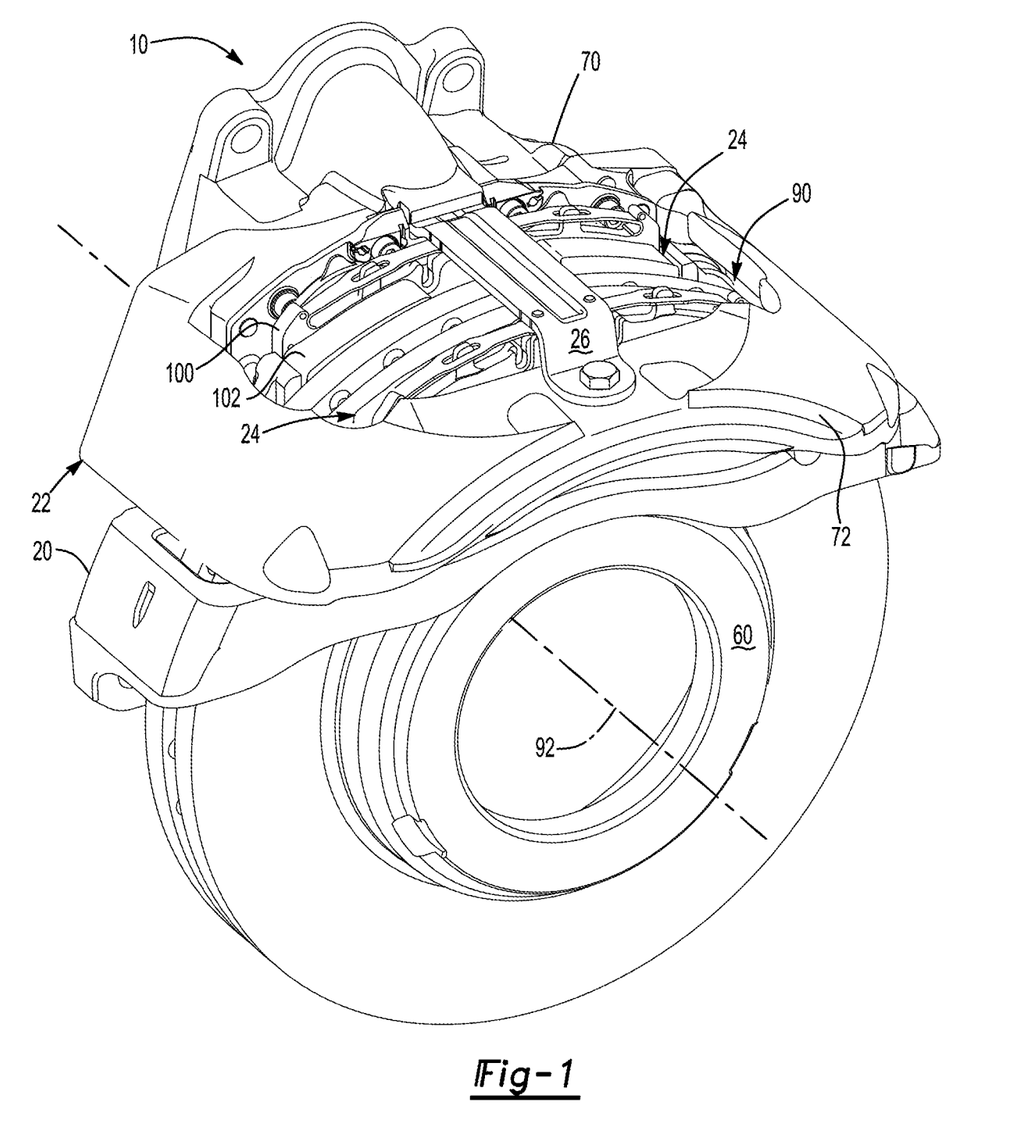
FIG. 1 is a perspective view of an example of a brake assembly.
Figure 4:
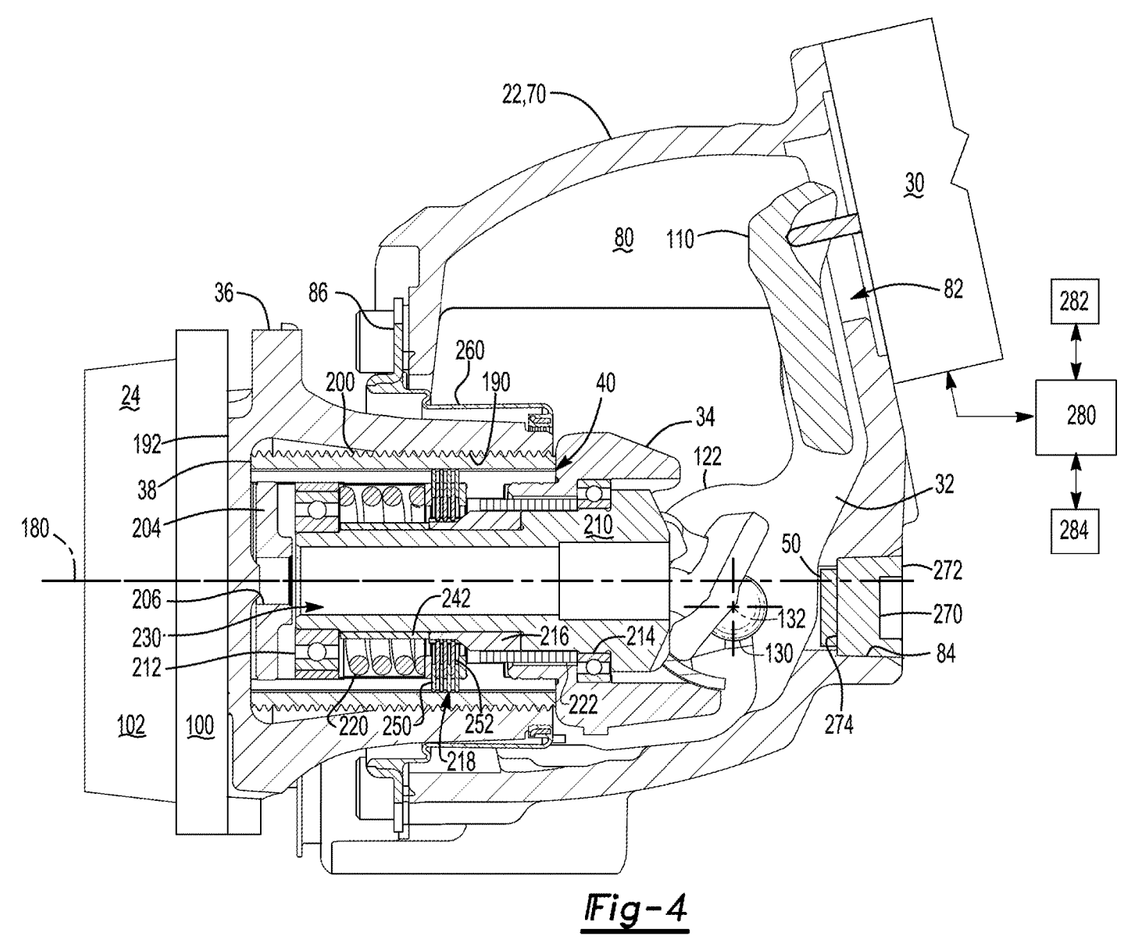
FIG. 4 is a section view of the brake assembly along section line 4-4.
Figure 6:
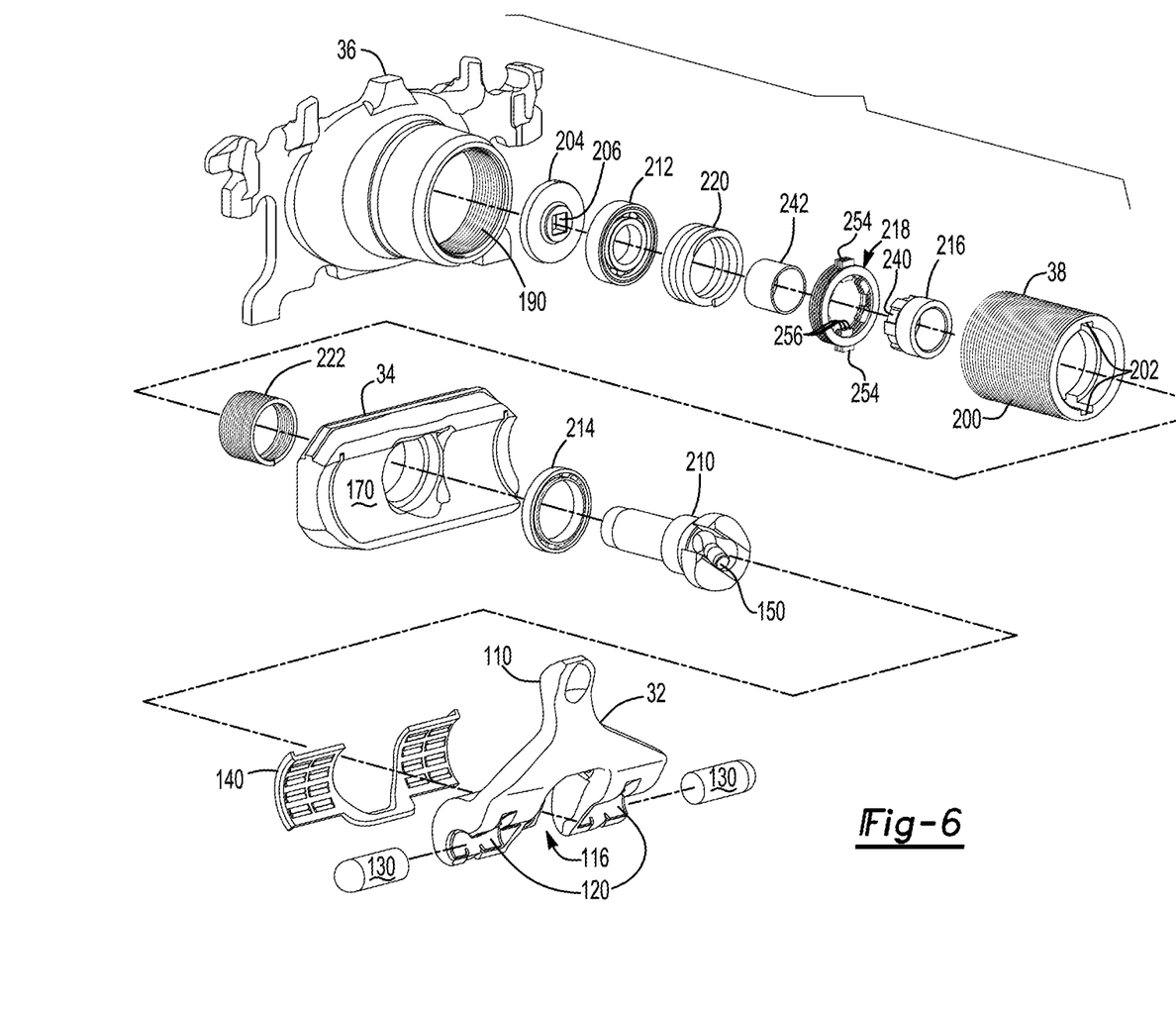

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. The brake assembly 10 may be configured as a disc brake. In at least one configuration, the brake assembly 10 may include a brake carrier 20, a brake caliper 22, a pair of brake pad assemblies 24, and optionally a retainer bracket 26. Referring primarily to FIGS. 4 and 6, the brake assembly 10 may include components that may facilitate movement of the brake pad assemblies 24, such as a brake actuator 30, an operating shaft 32, a yoke 34, a tappet 36, a piston 38, and a wear adjuster mechanism 40. The brake assembly 10 may optionally include a sensor 50.

Referring to FIG. 1, the brake carrier 20 may be fixedly mounted to the vehicle. For example, the brake carrier 20 may be directly or indirectly mounted to an axle assembly or a steering knuckle. The brake carrier 20 may receive and support the brake pad assemblies 24 in a manner that permits the brake pad assemblies 24 to move along an axis toward and away from the brake rotor 60 while inhibiting rotation of the brake pad assemblies 24 about the axis. The brake carrier 20 may include a rotor opening that may receive a brake rotor 60. As such, the brake carrier 20 may straddle the brake rotor 60 and help position the brake pad assemblies 24 on opposite sides of the brake rotor 60.

Figure 2:
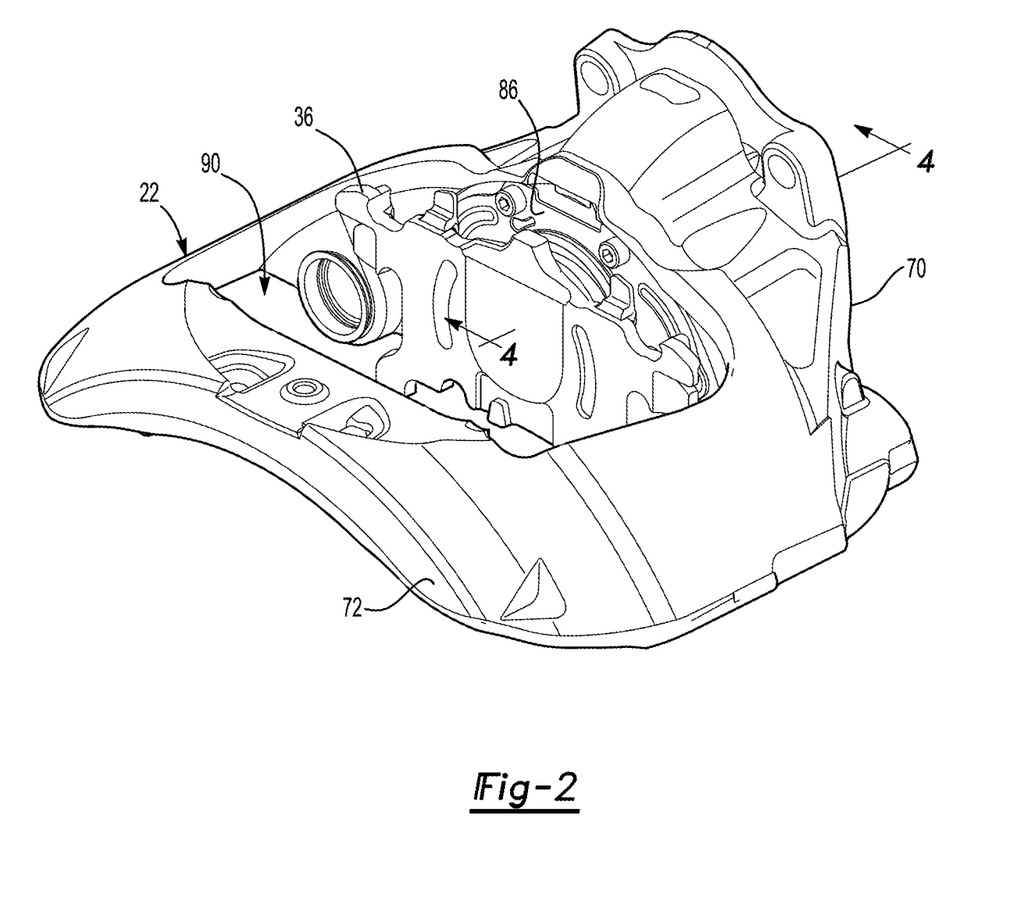
FIG. 2 is a perspective view of a portion of the brake assembly including an example of a brake caliper.

Referring to FIGS. 1 and 2, the brake caliper 22 may receive various components of the brake assembly 10. In addition, the brake caliper 22 may facilitate positioning of the brake pad assemblies 24 with respect to the brake rotor 60 to facilitate braking of the vehicle. In at least one configuration, the brake caliper 22 may be mounted to the brake carrier 20 and may include a caliper housing 70 and a caliper bridge 72.

The caliper housing 70, which may also be referred to as a brake caliper housing, may be moveably disposed on the brake carrier 20. For example, the caliper housing 70 may be slidably disposed on a pair of guide pins that may be fixedly disposed on the brake carrier 20. As is best shown in FIG. 4, the caliper housing 70 may facilitate mounting of the brake actuator 30 and may define a cavity 80, an opening 82, and a hole 84.

The cavity 80 may receive or partially receive various components that facilitate movement of the brake pad assemblies 24, such as the operating shaft 32, yoke 34, tappet 36, piston 38, and the wear adjuster mechanism 40. The cavity 80 may have an aperture that may face toward the brake rotor 60 and that may be at least partially enclosed by a cover plate 86 that may be fixedly mounted to the caliper housing 70, such as with fasteners like bolts.

Figure 3:
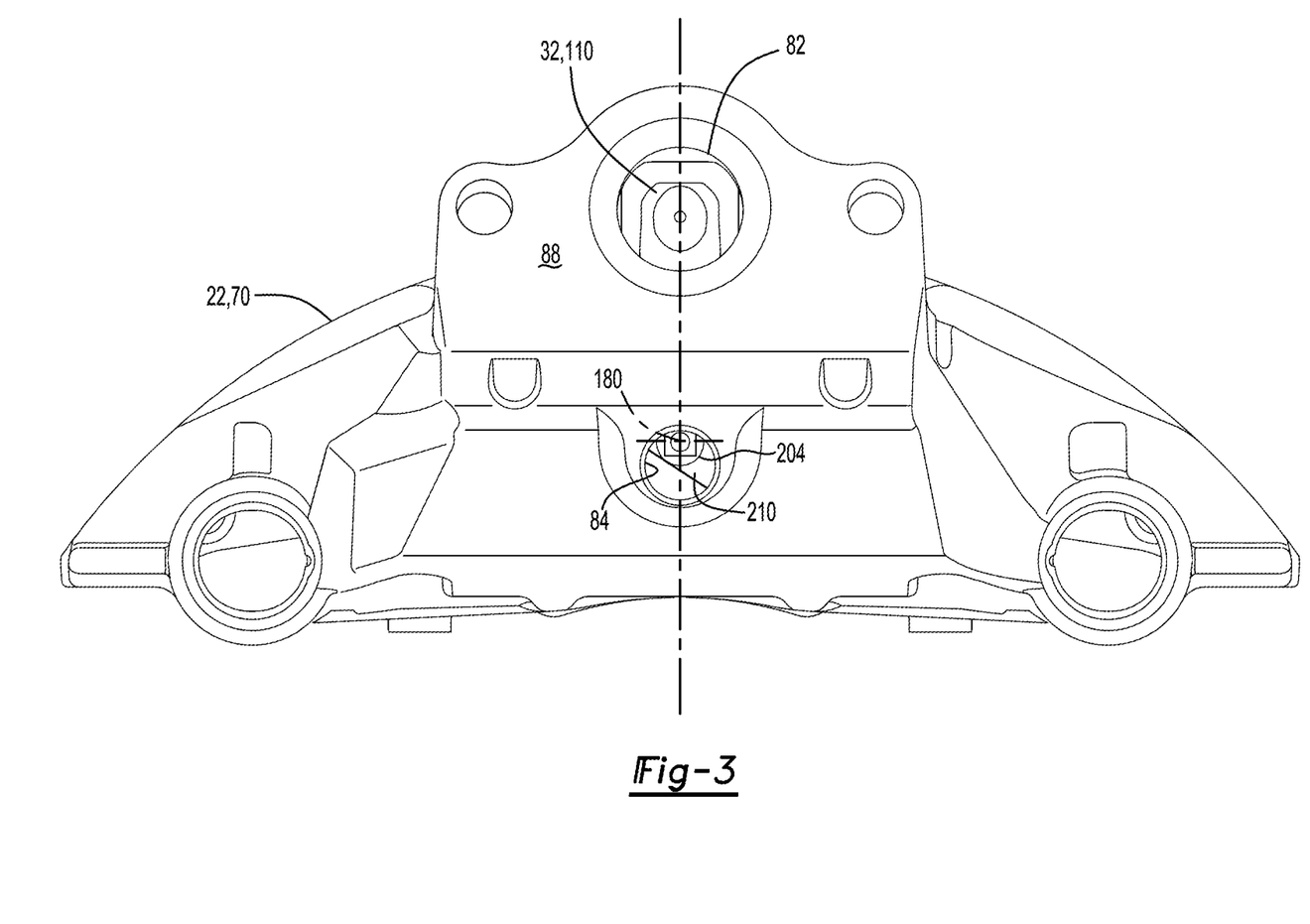
FIG. 3 is a rear side view of the portion of the brake assembly shown in FIG. 2.

Referring to FIGS. 3 and 4, the opening 82 may extend from the cavity 80 through a back wall 88 of the caliper housing 70 that may face away from the brake carrier 20 and the brake rotor 60. In at least one configuration, a shaft of the brake actuator 30 may extend through the opening 82 to facilitate actuation of the operating shaft 32. The opening 82 may be disposed above an axis 180.

The hole 84 may be a through hole that may extend from the cavity 80 through the back wall 88 of the caliper housing 70. The hole 84 may be spaced apart from the opening 82. The hole 84 may be sized such that the sensor 50 may be insertable and removeable through the hole 84 without disassembly of various components of the brake assembly 10 that facilitate movement of the brake pad assemblies 24, such as the wear adjuster mechanism 40. The hole 84 may be disposed above a brake rotor axis of rotation 92 and below the axis 180. The hole 84 may receive a plug, sensor, fitting, or combinations thereof as will be discussed in more detail below.

Referring to FIGS. 1 and 2, the caliper bridge 72 may be integrally formed with or may be fixedly disposed on the caliper housing 70. For example, the caliper bridge 72 may be coupled to the caliper housing 70 with one or more fasteners, such as bolts. In at least one configuration, the caliper bridge 72 may cooperate with the caliper housing 70 to at least partially define an opening 90 that may facilitate insertion and removal of the brake pad assemblies 24.

Referring to FIG. 1, a pair of brake pad assemblies 24 may be received in and may be supported by the brake carrier 20. The brake pad assemblies 24 may be disposed on opposite sides of the brake rotor 60 and may be engageable with the brake rotor 60 to slow rotation of the brake rotor 60 and an associated wheel about a brake rotor axis of rotation 92. One brake pad assembly 24 may be positioned between the caliper housing 70 and the brake rotor 60 and may be referred to as an inboard brake pad assembly 24. The brake pad assembly 24 located on the opposite side of the brake rotor 60 may be positioned between the caliper bridge 72 and the brake rotor 60 and may be referred to as an outboard brake pad assembly 24. The brake pad assemblies 24 may include a backplate 100 and friction material 102.

The backplate 100 may be a structural member of a brake pad assembly 24. The backplate 100 may be configured as a generally flat plate and may be made of any suitable material, such as metal or a metal alloy. As is best shown in FIG. 4, a side of the backplate 100 that faces away from the friction material 102 may engage or contact the tappet 36.

The friction material 102 may be disposed on a side of the backplate 100 that may face toward the brake rotor 60. The friction material 102 may contact the brake rotor 60 during vehicle braking.

Referring to FIG. 1, the retainer bracket 26 may be removably mounted to the brake caliper 22. For example, the retainer bracket 26 may extend across the brake pad assemblies 24 and the opening 90 in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening 90.

Referring to FIG. 4, the brake actuator 30 may be mounted to the brake carrier 20. In at least one configuration, the brake actuator 30 may be mounted to the back wall 88 of the caliper housing 70 and may have a brake actuator shaft that may extend through the opening 82 in the caliper housing 70. The brake actuator shaft may engage the operating shaft 32 and may be moveable to rotate the operating shaft 32.

Figure 5:
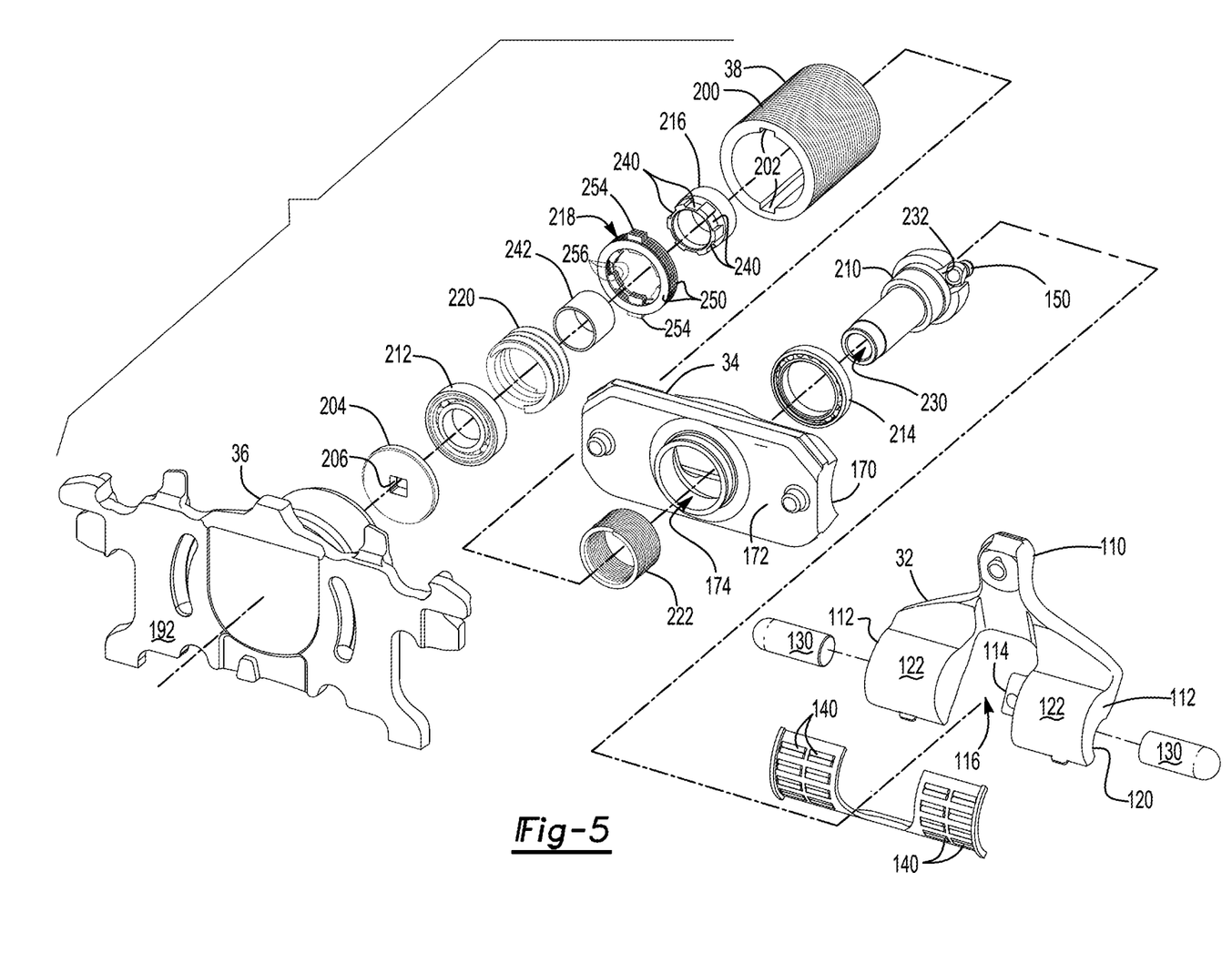
FIGS. 5 and 6 are exploded views of a portion of the brake assembly.

Referring to FIGS. 4-6, the operating shaft 32 may transmit force from the brake actuator 30 other moveable components of the brake assembly 10. In at least one configuration, the operating shaft 32 may generally be configured as an inverted "Y" and may include a lever 110, a pair of cams 112, and a tab 114.

Referring to FIG. 4, the lever 110 may extend from the cams 112 toward the opening 82. The lever 110 may have a pocket that may receive an end of the brake actuator shaft.

Referring to FIGS. 5 and 6, the cams 112 may be spaced apart from each other such that a gap 116 is provided between the cams 112. In at least one configuration, the cams 112 may have mirror symmetry with respect to each other.

In at least one configuration, a cam 112 may include a concave recess 120 and a convex surface 122.

The concave recess 120 may receive a corresponding roller 130. The roller 130 may be supported by a corresponding arcuate surface in the cavity 80 of the caliper housing 70 and may be rotatable about a roller axis of rotation 132, which is best shown in FIG. 4.

The convex surface 122 may be disposed opposite the concave recess 120. The convex surface 122 may engage a corresponding set of roller bearings 140 that may be disposed between the convex surface 122 and the yoke 34. The rollers 130 and roller bearings 140 may facilitate rotation of the operating shaft 32 about an axis of rotation. The operating shaft axis of rotation may be disposed at a radial centerline of the convex surface 122.

Referring to FIGS. 5 and 6, a tab 114 may extend from at least one of the cams 112 into the gap 116. A ball pin 150 may be fixedly mounted to the tab 114 and may extend toward the wear adjuster mechanism 40 as will be discussed in more detail below. In at least one configuration, the ball pin 150 may have a generally spherical or rounded ball at its distal end.

Referring to FIGS. 4-6, the yoke 34 may be disposed between the operating shaft 32 and the piston 38. In at least one configuration, the yoke 34 may include a concave surface 170, an engagement surface 172, and a through hole 174.

The concave surface 170 may face toward the operating shaft 32 and may engage the roller bearings 140.

The engagement surface 172 may be disposed opposite the concave surface 170. The engagement surface 172 may engage or contact an end of the piston 38.

The through hole 174 may be disposed proximate the center of the yoke 34 and may extend around an axis 180. The through hole 174 may receive at least a portion of the wear adjuster mechanism 40. The axis 180 may be offset from and may extend substantially parallel to the brake rotor axis of rotation 92.

Referring to FIGS. 4-6, the tappet 36 may be moveable along the axis 180 with respect to the caliper housing 70. However, the brake carrier 20 may inhibit or prevent the tappet 36 from rotating about the axis 180. The tappet 36 may protrude away from the cavity 80 of the caliper housing 70 and may have a generally hollow body that may include an inner female thread 190 and an engagement face 192.

The inner female thread 190 may face toward the axis 180 and may extend around the axis 180.

The engagement face 192 may face away from the cavity 80. The engagement face 192 may engage or contact a brake pad assembly 24. For example, the engagement face 192 may engage or contact a side of the backplate 100 that may be disposed opposite the friction material 102.

Referring to FIGS. 4-6, the piston 38 may be at least partially received inside the tappet 36. The piston 38 may be moveable along the axis 180. In addition, the piston 38 may be rotatable about the axis 180. In at least one configuration, the piston 38 may have a hollow tubular configuration that may include an outer female thread 200, at least one recess 202, and an end cap 204. The brake assembly 10 may be provided with a single piston 38 in one or more configurations.

The outer female thread 200 may face away from the axis 180 and may extend around the axis 180. The outer female thread 200 may mate with the inner female thread 190 of the tappet 36. As such, the tappet 36 and the piston 38 may have mating threads.

Referring to FIGS. 5 and 6, at least one recess 202 may be provided in an inner surface of the piston 38 that may be disposed opposite the outer female thread 200 and that may face toward the axis 180. In the configuration shown, two recesses 202 are provided that are disposed opposite each other and extend the length of the piston 38. The recesses 202 may facilitate mounting of a disc pack of the wear adjuster mechanism 40 as will be discussed in more detail below.

Referring to FIGS. 4-6, the end cap 204 may be disposed at an end of the piston 38 that may face toward the brake pad assembly 24 and the tappet 36. The end cap 204 may be integrally formed with the body of the piston 38 or may be provided as a separate component. In the configuration shown, the end cap 204 is provided as a separate component that may be received in the hollow body of the piston 38. The end cap 204 may be fixed to the piston 38 such that the piston 38 is not rotatable with respect to the end cap 204. In at least one configuration, the end cap 204 may include an end cap hole 206. The axis 180 may extend through the end cap hole 206.

Referring to FIG. 4, the wear adjuster mechanism 40 may be configured to maintain a desired running clearance between the brake pad assemblies 24 and the brake rotor 60 when the brake pad assemblies 24 are retracted. As an overview, the wear adjuster mechanism 40 may include a one-way clutch that may permit the axial position of a brake pad assembly along the axis 180 to be adjusted or move closer to the brake rotor 60 in response to wear of the friction material 102. The wear adjuster mechanism 40 may be provided in various configurations, some examples of which are disclosed in United States Patent Publication No. 2019/0024740, which is hereby incorporated by reference in its entirety. The wear adjuster mechanism 40 may be at least partially received inside the piston 38. In at least one configuration and as is best shown with reference to FIGS. 4-6, the wear adjuster mechanism 40 may include a shaft 210, a first bearing assembly 212, a second bearing assembly 214, a drum 216, a disc pack 218, a first biasing member 220, and a second biasing member 222.

The shaft 210 may be at least partially received in the cavity 80 of the caliper housing 70. The shaft 210 may be disposed in the through hole 174 of the yoke 34 and inside the hole or cavity of the piston 38. In addition, the shaft 210 may be spaced apart from the yoke 34 and the piston 38. The shaft 210 may be rotatable about the axis 180 and may define a shaft cavity 230 and a ball pin engagement feature 232.

The shaft cavity 230 may extend along the axis 180. In at least one configuration, the shaft cavity 230 may be configured as a through hole that may extend along the axis 180 from a first end of the shaft 210 to a second end of the shaft 210 that may be disposed opposite the first end of the shaft 210. A portion of the shaft cavity 230 that may be received inside the yoke 34 may have a larger diameter than a portion of the shaft cavity 230 that may be received inside the piston 38.

Referring primarily to FIG. 5, the ball pin engagement feature 232 may be configured to engage the ball pin 150. The ball pin engagement feature 232 may be disposed at an end of the shaft 210 that may face toward the operating shaft 32 and may be offset from the axis 180. In the configuration shown, the ball pin engagement feature 232 is configured as a recess that may receive the ball pin 150. The ball pin 150 may extend at an angle with respect to the axis 180 such that rotation of the operating shaft 32 may cause the ball pin 150 to engage a side or surface of the ball pin engagement feature 232 in a manner that may rotate the shaft 210 about the axis 180. It is also contemplated that the ball pin engagement feature 232 may have a male configuration and the ball pin 150 may have a female configuration in other configurations.

Referring to FIGS. 4-6, the first bearing assembly 212 may rotatably support the shaft 210. The first bearing assembly 212 may be disposed proximate a first end of the shaft 210 and may receive the shaft 210. For instance, the first bearing assembly 212 may extend around the shaft 210 and may be received inside the piston 38. As such, the first bearing assembly 212 may extend from the shaft 210 to or toward the inner surface of the piston 38.

The second bearing assembly 214 may rotatably support the shaft 210. The second bearing assembly 214 may be disposed proximate a second end of the shaft 210 and may receive the shaft 210. For instance, the second bearing assembly 214 may extend around the shaft 210 and may be received inside the through hole 174 of the yoke 34. As such, the second bearing assembly 214 may extend from the shaft 210 to or toward the yoke 34.

The drum 216 may be received inside the piston 38 and may be spaced apart from the piston 38. The drum 216 may extend around and may receive a portion of the shaft 210. In addition, the shaft 210 may be selectively rotatable about the axis 180 with respect to the drum 216 as will be discussed in more detail below. In at least one configuration, the drum 216 may have a hollow tubular construction that may include at least one recess 240. As is best shown in FIG. 5, a plurality of recesses 240 are arranged around an exterior side of the drum 216 that faces away from the axis 180. The recesses 240 may extend from an end of the drum 216 that may face toward the tappet 36 toward an opposite end of the drum 216. The recesses 240 may facilitate mounting of the disc pack 218. As is best shown in FIG. 4, axial movement of the drum 216 may be constrained by the shaft 210 and by a spacer 242 that may extend from an end of the drum 216 to the first bearing assembly 212.

Referring to FIGS. 4-6, the disc pack 218 may selectively couple the piston 38 and the drum 216. The disc pack 218 may include a plurality of discs that may include at least one outer disc 250 and at least one inner disc 252. As is best shown in FIGS. 5 and 6, the outer discs 250 may have at least one tab 254 that may be received in a recess 202 of the piston 38. As such, the outer discs 250 may be rotatable about the axis 180 with the piston 38. The inner discs 252 may have at least one tab 256 that may be received in a recess 240 of the drum 216. As such, the inner discs 252 may be rotatable about the axis 180 with the drum 216. The outer discs 250 and the inner discs 252 may be arranged in an alternating order in an axial direction or in a direction that extends along the axis 180. For instance, at least one inner disc 252 may be axially positioned between two adjacent outer discs 250 or vice versa. The piston 38 may be rotatable about the axis 180 with the drum 216 when the discs of the disc pack 218 are sufficiently compressed such that the outer discs 250 and the inner discs 252 do not slip with respect to each other. Conversely, the drum 216 may be rotatable with respect to the piston 38 when the discs of the disc pack 218 are not sufficiently compressed or when the outer discs 250 and the inner discs 252 slip with respect to each other.

Referring to FIGS. 4-6, the first biasing member 220 may exert a biasing force on the disc pack 218. The first biasing member 220 may have any suitable configuration. For instance, the first biasing member 220 may be configured as a spring that may extend from the first bearing assembly 212 to the disc pack 218 and that may exert a biasing force on the disc pack 218 in a direction that may extend toward the yoke 34. As such, the first biasing member 220 may compress the discs of the disc pack 218.

The second biasing member 222 may selectively couple the shaft 210 and the drum 216. The second biasing member 222 may have any suitable configuration. For example, the second biasing member 222 may be configured as a wrap spring that may be axially positioned between the disc pack 218 and the second bearing assembly 214. The second biasing member 222 may be partially received inside the yoke 34 and may be partially received inside the piston 38. The second biasing member 222 may extend around the shaft 210 and may extend around a portion of the drum 216. The second biasing member 222 may be configured to slip and allow the shaft 210 to rotate with respect to the drum 216 and the piston 38 when the brake is released or braking is disengaged as will be discussed in more detail below.

One or more retraction springs may be provided to facilitate retraction of the brake pad assemblies 24. A retraction spring may be received in the cavity 80 of the caliper housing 70 and may extend from the yoke 34 to the cover plate 86. The retraction spring may be configured to actuate the yoke 34 away from the cover plate 86 since the cover plate 86 is fixed to the caliper housing 70. As such, the retraction spring may urge the yoke 34 to move along the axis 180 in a direction that extends away from the brake rotor 60 and the cover plate 86.

Referring to FIG. 4, the controller 280 may monitor and control operation of the brake assembly 10. For instance, the controller 280 may monitor and control operation of the brake actuator 30. The controller 280 may be of any suitable type, such as a multiprocessor-based controller. The controller 280 may also process signals or data from various input devices, such as the sensor 50 and one or more input devices 282, such as a brake pedal sensor or another sensor that may trigger braking of the vehicle, such as an adaptive cruise control system or a proximity sensor that may detect an object or obstruction in front of the direction of travel of the vehicle. The controller 280 may also communicate with an operator communication device 284 that may provide information to a vehicle operator. The operator communication device 284 may be of any suitable type. For instance, the operator communication device 284 may produce an audible output, visual output, tactile output, or combinations thereof. Some examples of operator communication devices may include a display, light, other, speaker, haptic device, or combinations thereof.

Referring to FIG. 4, operation of the brake assembly 10 will now be described in more detail. As an overview, the brake assembly 10 may start in a retracted state in which braking of the vehicle is not requested. As such, the brake pad assemblies 24 may be retracted away from the brake rotor 60 and components of the brake assembly 10 may be positioned as shown. In response to a vehicle braking command, such as may be provided by an input device 282, the controller 280 may initiate braking of the vehicle. The controller 280 may operate the brake actuator 30 to extend the brake actuator shaft, thereby rotating the operating shaft 32 about its axis of rotation in a first direction or a counterclockwise direction from the perspective shown. Rotation of the operating shaft 32 may move the yoke 34, tappet 36, piston 38, wear adjuster mechanism 40, and the inboard brake pad assembly 24 that is disposed adjacent to the tappet 36 along the axis 180 toward the brake rotor 60 or to the left from the perspective shown. Movement of the yoke 34 toward the brake rotor 60 may compress the retraction springs. In addition, rotation of the operating shaft 32 may cause the ball pin 150 to engage the ball pin engagement feature 232 of the shaft 210, which may rotate the shaft 210 about the axis 180. Once the inboard brake pad assembly 24 contacts the brake rotor 60 a reaction force may then move the brake caliper 22 with respect to the brake carrier 20 to actuate the outboard brake pad assembly 24 that is disposed between the brake rotor 60 and the caliper bridge 72 into engagement with an opposite side of the brake rotor 60 to help slow rotation of the brake rotor 60 and an associated vehicle wheel. Retracting the brake actuator shaft may allow the operating shaft 32 to rotate about its axis of rotation in a clockwise direction from the perspective shown, which in turn may allow the actuation sequence to proceed in reverse under the biasing force of the retraction springs.

Rotation of the operating shaft 32 may or may not result in adjustment of the running clearance between the brake pad assembly 24 and the brake rotor 60. For example, rotation of the operating shaft 32 in the first direction may operate the wear adjuster mechanism 40 to extend the tappet 36 closer to the brake rotor 60 with respect to the piston 38 when the operating shaft 32 and the ball pin 150 rotate the shaft 210 about the axis 180 before the inboard brake pad assembly 24 contacts the brake rotor 60. As such, the shaft 210 and the drum 216 may rotate together about the axis 180 due to the force exerted by the second biasing member 222. Rotation of the drum 216 may cause the piston 38 to rotate about the axis 180 due to the coupling provided by the disc pack 218. Rotation of the piston 38 may extend the tappet 36 (i.e., extend the tappet 36 further away from the yoke 34 and closer to the brake rotor 60) due to the mating of the outer female thread 200 of the piston 38 and the inner female thread 190 of the tappet 36. For example, rotation of the piston 38 may cause the tappet 36 to extend to the left from the perspective shown with respect to the piston 38 due to operation of the mating threads since the tappet 36 is inhibited from rotating about the axis 180 by the brake carrier 20. Extension of the tappet 36 with respect to the piston 38 may stop when the inboard brake pad assembly 24 contacts the brake rotor 60. For example, the torque required to rotate the piston 38 increases substantially when the inboard brake pad assembly 24 contacts the brake rotor 60 even when the brake actuator 30 continues to rotate the operating shaft 32 and hence continues to rotate the shaft 210. As a result, the discs of the disc pack 218 may slip with respect to each other, thereby permitting rotation of the shaft 210 with respect to the piston 38.

The wear adjuster mechanism 40 may operate to hold the tappet 36 in its adjusted position when the brake pad assemblies 24 are retracted. For example, when the brake actuator 30 is retracted the operating shaft 32 may rotate in a second direction that is disposed opposite the first direction, or clockwise from the perspective shown. The ball pin 150 may then rotate the shaft 210 in the opposite direction back to its previous rotational position. However, the force exerted by the disc pack 218 may exceed the force exerted by the second biasing member 222. As a result, the disc pack 218 may inhibit rotation of the piston 38 about the axis 180 with respect to the drum 216 while the second biasing member 222 may slip or allow the shaft 210 to rotate about the axis 180 in the second direction with respect to the drum 216 and back to its previous position.

Rotation of the operating shaft 32 may not result in adjustment of the running clearance between the brake pad assembly 24 and the brake rotor 60 when the inboard brake pad assembly 24 contacts the brake rotor 60 before the operating shaft 32 and the ball pin 150 rotate the shaft 210 about the axis 180. As previously discussed, the torque required to rotate the piston 38 increases substantially when the inboard brake pad assembly 24 contacts the brake rotor 60. As a result, the discs of the disc pack 218 may slip with respect to each other as the operating shaft 32 rotates in the first direction, thereby permitting rotation of the shaft 210 with respect to the piston 38 while rotation of the piston 38 is opposed by the tappet 36 reacting against the brake rotor 60. The wear adjuster mechanism 40 may operate to hold the tappet 36 in its current position when the brake pad assemblies 24 are retracted (e.g., the disc pack 218 may inhibit rotation of the piston 38 about the axis 180 while the second biasing member 222 may slip or allow the shaft 210 to rotate about the axis 180 and back to its previous position as previously described).

Referring to FIG. 4, the cavity 80 inside the caliper housing 70 may be sealed from the surrounding environment to inhibit moisture or water from entering the cavity 80. For example, the brake actuator 30 and the cover plate 86 may directly or indirectly seal against the caliper housing 70, such as with an intervening seal or gasket that may facilitate sealing of a corresponding opening of the caliper housing 70. Similarly, a flexible boot 260 may extend from the tappet 36 to the caliper housing 70 and/or the cover plate 86 to provide sealing between the tappet 36 and the caliper housing 70 while accommodating movement of the tappet 36. In addition, the through hole 84 in the caliper housing 70 may receive a component such as a plug 270 that may facilitate sealing of the through hole 84.

Sealing of the cavity 80 may help prevent corrosion of components or surfaces inside the cavity 80 of the caliper housing 70. For example, moisture inside the cavity 80 can lead to corrosion of components inside the cavity 80 that facilitate movement like the operating shaft 32, yoke 34, tappet 36, piston 38, wear adjuster mechanism 40, rollers 130, roller bearings 140, or corrosion of surfaces that may support these components or that these components may move upon. A small amount of moisture may be present in the cavity 80 at the time of assembly due to water vapor in the air inside the cavity 80. However, the amount of moisture in the cavity 80 may change if there is leakage or a leak path between the cavity 80 and the surrounding outside environment. For instance, leakage may occur around or through the brake actuator 30, cover plate 86, flexible boot 260 or the like during use. A leak path may allow water or additional water vapor to enter the cavity 80, which may increase the potential for corrosion. Visual inspection of surfaces and components of the brake assembly 10 for a leak path and/or for corrosion is inherently subjective, is reliant upon the thoroughness of the visual inspection by an inspector, and is thus subject to error. In addition, visual inspection may require removal of a vehicle wheel to permit access by the inspector, extensive disassembly of the brake assembly, or both. Such steps may increase inspection times in associated costs. The sensor 50 may address some or all of these deficiencies.

In the configuration shown in FIG. 4, the sensor 50 may be positioned in the cavity 80 of the caliper housing 70. In at least one configuration, the sensor 50 may provide a visual indication of the level of moisture or level of humidity in the cavity 80. The sensor 50 may be disposed on the plug 270, which may be at least partially received in the through hole 84 of the caliper housing 70 and may seal against the caliper housing 70. For instance, the sensor 50 may be disposed on or may be adhered to a first end 272 of the plug 270 that may face toward the cavity 80. The plug 270 may also have a second end 274 that may be disposed opposite the first end 272 and may face away from the cavity 80 or may be disposed outside the cavity 80. Accordingly, the sensor 50 may be disposed in the cavity 80 or may be in fluid communication with the cavity 80 so that it may detect the moisture level or humidity level in the cavity 80.

The sensor 50 may be configured to change color, change opacity, or both, in response to moisture. For instance, the sensor 50 may be a moisture indicating label that may change color (e.g., change color from white to red) when the level of moisture exceeds a threshold amount. As another example, the sensor 50 may be a moisture indicating label that may change opacity (e.g., change from opaque to clear/transparent/semi-transparent or vice versa) at a predetermined moisture level or a predetermined humidity level. Such sensors may employ a moisture-sensitive chemical compound, including but not limited to a cobalt chloride base or a cobalt-free chloride base. This predetermined moisture level or predetermined humidity level may be referred to as the threshold amount.

Figures 7, 8:
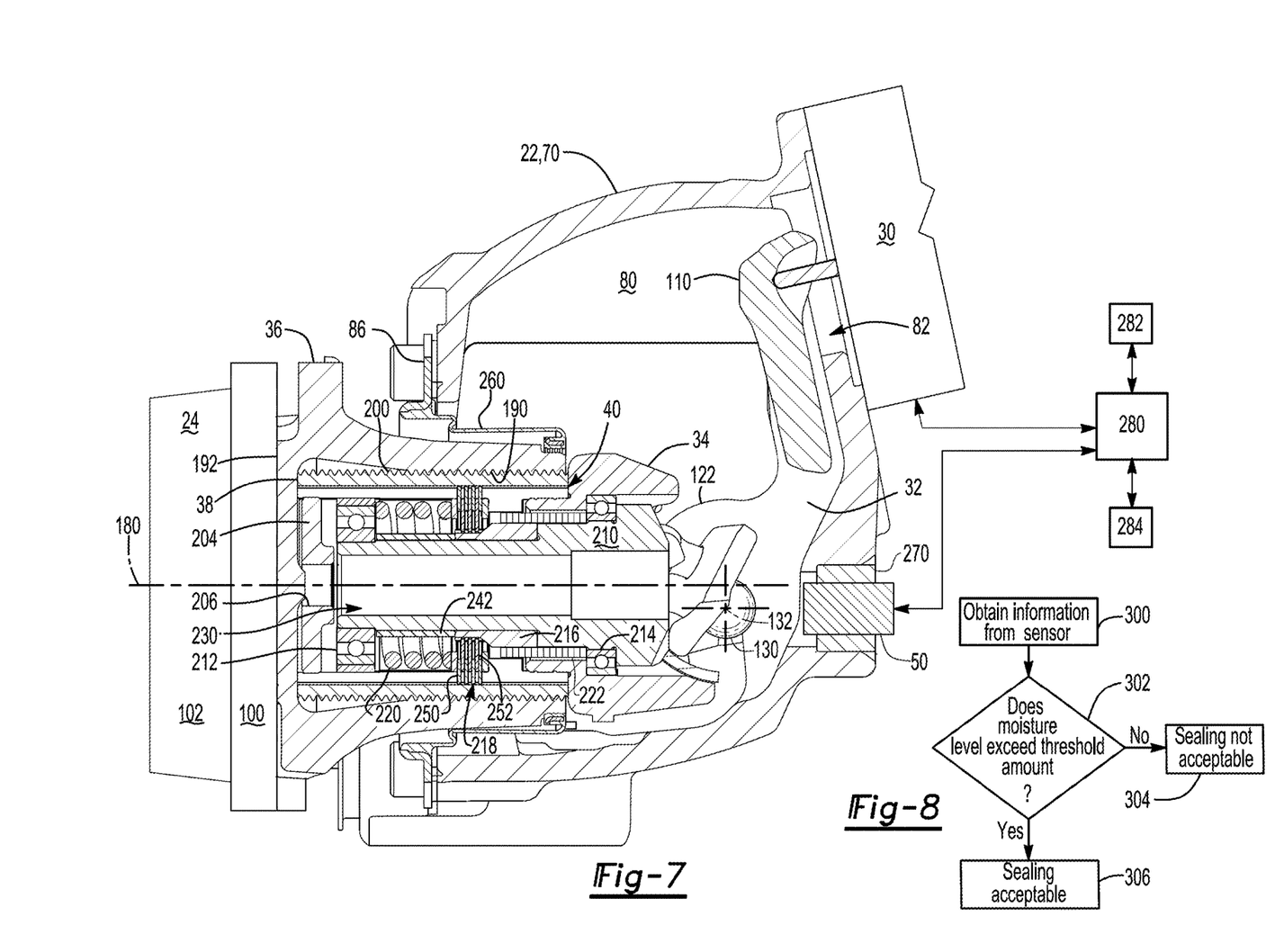
FIG. 7 is section view of second configuration of the brake assembly along section line 4-4.
FIG. 8 is a flowchart of a method of checking sealing of the brake caliper housing that is associated with FIGS. 1-7.

In the configuration shown in FIG. 7, the sensor 50 may also be positioned in the cavity 80 or may be in fluid communication with the cavity 80 of the caliper housing 70. In this configuration, the sensor 50 may provide a signal, such as an electromagnetic or electrical signal, that may be indicative of the moisture level or humidity level in the cavity 80. The sensor 50 may extend through the plug 270 or may replace the plug 270. The sensor 50 may be of any suitable type. For instance, the sensor 50 may be a humidity sensor, such as an absolute humidity sensor or relative humidity sensor, which may include but may not be limited to a capacitive humidity sensor, resistive humidity sensor, or the like. For instance, the sensor 50 may create a signal or voltage proportional to the water content of the fluid or air inside the cavity 80.

The sensor 50 may communicate the level of moisture in the cavity 80 to a controller 280. The controller 280 may monitor and/or control operation of the brake assembly 10. For instance, the controller 280 may control operation of the brake actuator 30. The controller 280 may be of any suitable type, such as a multiprocessor-based controller. The controller 280 may also process signals or data from various input devices, such as the sensor 50 and one or more input devices 282, such as a brake pedal sensor or another sensor that may trigger braking of the vehicle, such as an adaptive cruise control system or a proximity sensor that may detect an object or obstruction in front of the direction of travel of the vehicle. The controller 280 may also communicate with an operator communication device 284 that may provide information to a vehicle operator. The operator communication device 284 may be of any suitable type. For instance, the operator communication device 284 may produce an audible output, visual output, tactile output, or combinations thereof. Some examples of operator communication devices may include a display, light, other, speaker, haptic device, or combinations thereof.

Referring to FIG. 8, a flowchart of a method of checking sealing of caliper housing 70 is shown. This method may be employed with brake assembly configurations like that shown in FIGS. 1-7. In such configurations, the sensor 50 may be in fluid communication with the cavity 80 and may be positioned in the cavity 80 of the caliper housing 70 so that the sensor 50 may detect or determine the level of moisture in the cavity 80. Moreover, the brake assembly 10 may be in an assembled state such that the brake caliper 22 is assembled to the point that the cavity 80 is presumable sealed from the outside environment.

At block 300, information or data may be obtained from the sensor 50 that is indicative of the moisture or humidity level in the cavity 80. For instance, a sensor 50 that provides a visual indication of the level of moisture or level of humidity in the cavity 80, like that shown in FIG. 4, may be visually inspected. The sensor 50 may be visually inspected by looking at the sensor 50 through a window or sight glass in the caliper housing 70 or by removing the sensor 50 from the cavity 80 to facilitate visual inspection. For instance, the plug 270 may be removed from the hole 84 with the sensor 50 mounted on the plug 270, and then the sensor 50 may then be visually inspected to determine whether the level of moisture detected by the sensor exceeds a threshold amount (e.g., the sensor 50 may be visually inspected for change in color and/or opacity). In the case of the sensor 50 like that is shown in FIG. 7, the plug 270 and sensor 50 may not be removed but instead the signal indicative of the moisture level may be communicated to the controller 280.

At block 302, the method may determine whether the level of moisture exceeds the threshold amount. In the configuration shown in FIG. 4, the level of moisture may exceed the threshold amount when the sensor 50 undergoes a change in color and/or opacity as previously discussed. In the configuration shown in FIG. 7, the controller 280 may compare the level of moisture detected by the sensor 50 to a threshold amount that may be stored in memory. The threshold amount may be based on design specifications or vehicle development testing. As an example, the threshold amount may be an absolute or relative humidity level that exceeds 50%. If the level of moisture does not exceed the threshold amount (i.e., the sensor 50 does not undergo a color change or opacity change or the moisture level indicated by the signal from the sensor 50 does not exceed the threshold amount), then the method may continue at block 304. If the level of moisture exceeds the threshold amount (e.g., the sensor 50 undergoes a change in color and/or opacity or the moisture level indicated by the sensor exceeds the threshold amount), then the method may continue at block 306.

At block 304, the cavity 80 is considered to be adequately sealed or acceptably sealed. In the configuration shown in FIG. 4, the sensor 50 and plug 270 may then be replaced. For instance, the plug 270 may be reinstalled in the hole 84 with the same sensor 50 or the sensor 50 may be removed from the plug 270, a new sensor or replacement sensor 50 may be attached to the plug 270, and the plug 270 may be reinstalled in the hole 84 with the new sensor 50. In the configuration shown in FIG. 7, the moisture level may continue to be monitored with the sensor 50 on a continuous or discontinuous basis.

At block 306, the cavity 80 is not considered to be adequately or acceptably sealed since an elevated level of moisture was detected. The brake assembly 10 may then undergo further inspection or evaluation to determine the source of any leaks and to repair the leak or leaks. In the configuration shown in FIG. 4, the sensor 50 may be replaced with a new sensor or replacement sensor 50 and the plug 270 may be reinstalled in the hole 84 with the new sensor 50 after repairs are made so that future leaks may be detected with the replacement sensor 50. In the configuration shown in FIG. 7, the controller 280 may provide an output, such as via the operator communication device 284, to provide information that elevated moisture has been detected and that the cavity 80 may not be sealed.

Figure 9:
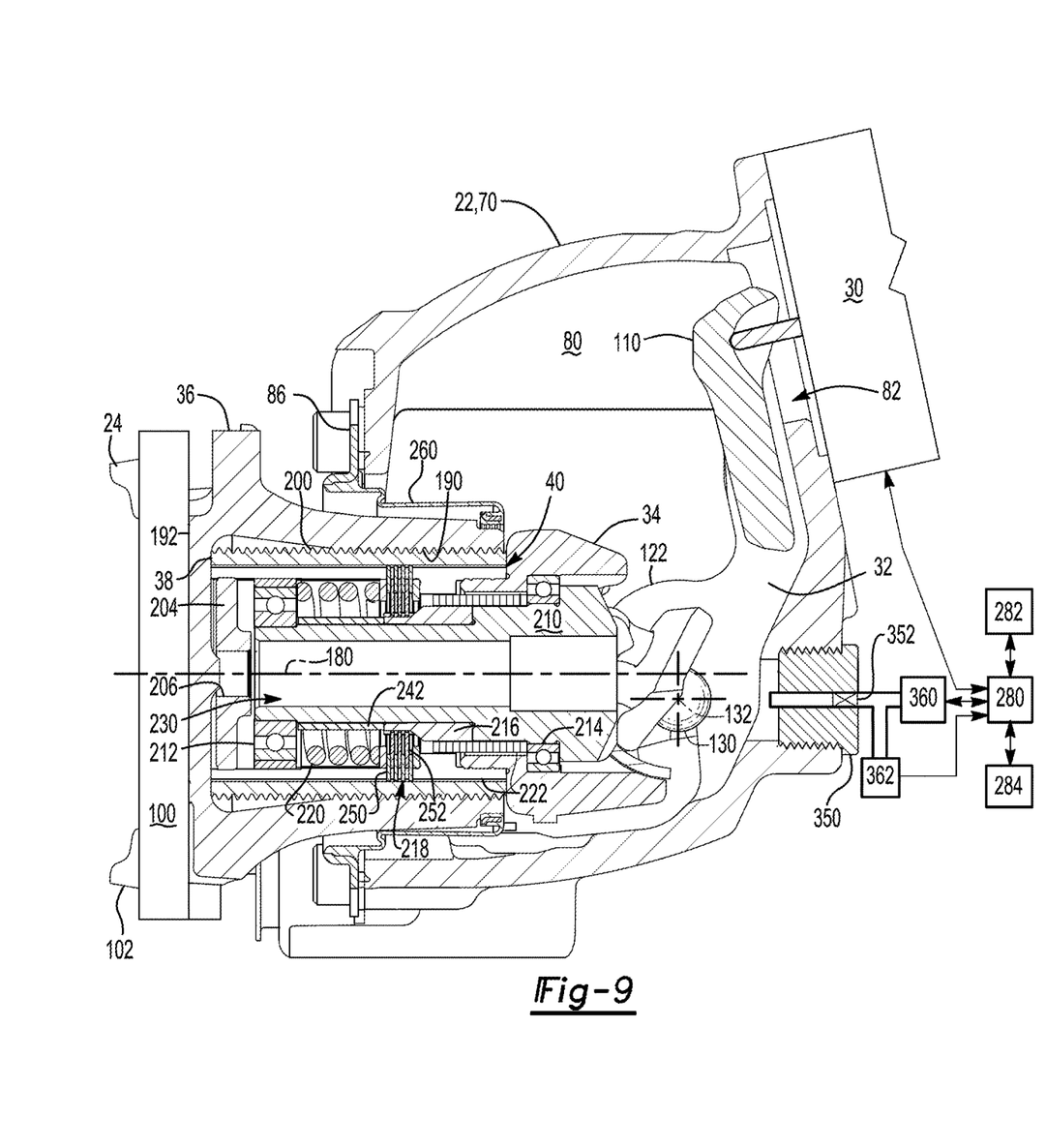
FIG. 9 is a section view of a third configuration of the brake assembly along section line 4-4.

Referring to FIG. 9, another configuration of a brake assembly 10 is shown that facilitates checking of the sealing of the caliper housing 70. In this configuration, a fitting 350 may be received in the hole 84 in the caliper housing 70. The fitting 350 may be fluidly connected to the cavity 80 and may include a valve 352.

The valve 352 may be of any suitable type and may have any suitable configuration. For instance, the valve 352 may be a two-way valve that may permit fluid to pass through the valve 352 to the cavity 80 or from the cavity 80 when the valve 352 is open. The valve 352 may be normally closed.

The fitting 350 and valve 352 may be fluidly connectable to a pressure adjustment source 360 that may provide increased fluid pressure, decreased fluid pressure, or both. The fluid inside the cavity 80 may be a gas or gas mixture such as air; however, it is contemplated that another gas or gas mixture could be provided other than air like nitrogen gas, helium gas, an inert gas, or the like. The term "air pressure" may be used herein to generically reference air as the gas mixture or other gases or gas mixtures that may be provided to or exhausted from the cavity 80. Fluid may pass through the valve 352 and through the fitting 350 when the pressure in the cavity 80 is changed, such as when the pressure is changed with the pressure adjustment source 360.

The pressure adjustment source 360 may provide negative pressure, positive pressure, or both. For instance, the pressure adjustment source 360 may provide negative pressure to extract air from the cavity 80 through a passage in the fitting 350 when the valve 352 is opened. Conversely, the pressure adjustment source 360 may provide positive pressure to provide air or a gas mixture to the cavity 80 through the passage in the fitting 350 and the valve 352 to increase the fluid pressure inside the cavity 80.

A pressure sensor 362 may be fluidly connectable to the cavity 80. The pressure sensor 362 may provide a signal indicative of the fluid pressure or air pressure in the cavity 80, such as when the valve 352 is open. The pressure sensor 362 may be of any suitable type and may be disposed in any suitable location, such as between the cavity 80 and the valve 352 or between the valve 352 and the pressure adjustment source 360. As such, the pressure sensor 362 may be disposed outside the brake assembly 10 in one or more configurations.

Figure 10:
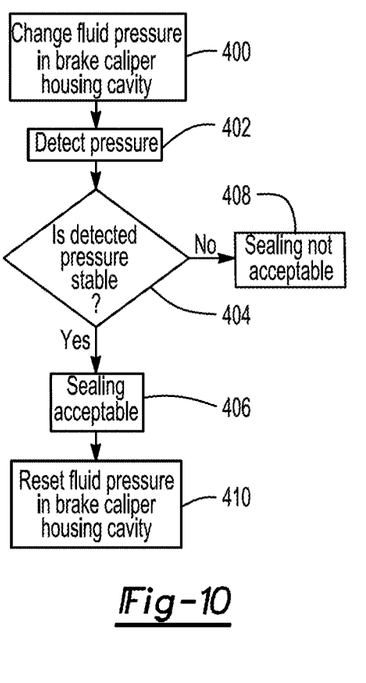
FIG. 10 is a flowchart of another method of checking sealing of the brake caliper housing that is associated with FIG. 9.

Referring to FIG. 10, a flowchart of a method of checking sealing of caliper housing 70 is shown. This method may be employed with brake assembly configurations or a system configuration like that shown in FIG. 9. The method may be employed during initial assembly of the brake assembly 10 by the manufacturer or by a technician during maintenance or inspection of the brake assembly 10. In addition, the method may be employed when the brake assembly 10 is not operated to extend or retract the brake pad assemblies.

At block 400, the fluid pressure in the cavity 80 may be changed. The fluid pressure may be changed with the pressure adjustment source 360. For instance, the pressure adjustment source 360 may be connected to the fitting 350. The valve 352 may be opened and the pressure in the cavity 80 may be changed by either supplying air to the cavity 80 to increase the fluid pressure in the cavity 80 above the surrounding atmospheric pressure or by extracting air from the cavity 80 to decrease the fluid pressure in the cavity 80 below the surrounding atmospheric pressure. The change in pressure may be an amount that is outside the error range of the sensor. As an example, the pressure may be increased or decreased by 10 psi (69 kPa) or more.

At block 402 the pressure of the fluid may be detected. For example, the fluid pressure may be detected with the pressure sensor 362 and may be indicative of the pressure in the cavity 80.

At block 404, the detected pressure may be evaluated to determine whether the detected pressure is stable. Stable pressure may be indicative of no leaks or a sufficiently sealed cavity 80. For instance, the detected pressure may be stable when the pressure detected by the pressure sensor 362 is within a predetermined range after a predetermined period of time. The predetermined range may be based on the design tolerances of the pressure sensor 362. As an example, the predetermined range may be ±1 psi (6.9 kPa) although larger or smaller ranges are contemplated if accommodated by the pressure sensor 362. The predetermined period of time may be based on development testing. As an example, the predetermined period of time may be greater than 5 seconds, such as between 5 seconds and 60 seconds, and predetermined periods of time greater than 60 seconds are also contemplated. If the detected pressure is stable, then the method may continue at block 406. If the detected pressure is not sufficiently stable, then the method may continue at block 408.

At block 406, the cavity 80 is considered to be adequately sealed or acceptably sealed since the detected pressure is sufficiently stable over or at the end of the predetermined period of time.

At block 408, the cavity 80 is not considered to be adequately or acceptably sealed since the detected pressure is not sufficiently stable over or at the end of the predetermined period of time. The presence of one or more leaks may allow pressurized gas in the cavity 80 to escape the cavity 80 or may allow air from the surrounding environment to enter the cavity 80 if negative pressure has been applied. The controller 280 may provide an output such as via the operator communication device 284 to provide information that that the cavity 80 may not be properly sealed. The brake assembly 10 may then undergo further inspection or evaluation to determine the source of any leaks and to repair the leak or leaks.

At block 410, the pressure in the cavity 80 may be reset to its previous state. For instance, if negative pressure was applied, then additional air may be provided to the cavity 80 to generally equalize the pressure in the cavity 80 with the surrounding atmospheric pressure. Similarly, if positive pressure was applied, then air may be exhausted from the cavity 80 to generally equalized the pressure in the cavity 80 with the surrounding atmospheric pressure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of checking sealing of a brake caliper housing, the method comprising:
   providing a sensor in fluid communication with a cavity of the brake caliper housing, wherein the brake caliper housing defines a through hole that extends from the cavity, a plug is received in the through hole, and the sensor is disposed on the plug; and
   determining a level of moisture in the cavity with the sensor.

2. The method of claim 1 wherein the sensor is disposed in the cavity and provides a visual indication of the level of moisture and the method further comprises removing the sensor from the cavity and visually inspecting the sensor to determine whether the level of moisture detected by the sensor exceeds a threshold amount.

3. The method of claim 2 further comprising replacing the sensor when the level of moisture detected by the sensor does not exceed the threshold amount.

4. The method of claim 1 wherein the plug has a first end that faces toward the cavity and a second end that is disposed opposite the first end and that is disposed outside the cavity, wherein the sensor is affixed to the first end of the plug.

5. The method of claim 4 wherein the sensor is a moisture indicating label that is adhered to the first end and that changes color when the level of moisture exceeds a threshold amount.

6. The method of claim 4 wherein the sensor is a moisture indicating label that is adhered to the first end and that changes opacity when the level of moisture exceeds a threshold amount.

7. A method of checking sealing of a brake caliper housing, the method comprising:
   providing a sensor in fluid communication with a cavity of the brake caliper housing; and
   determining a level of moisture in the cavity with the sensor, wherein the brake caliper housing defines a through hole that extends from the cavity and wherein the sensor extends through the through hole.

8. The method of claim 7 wherein the sensor extends through a plug that is received in the through hole.

9. The method of claim 7 wherein the sensor is a humidity sensor that is electrically connected to a controller and communicates the level of moisture in the cavity of the brake caliper housing to the controller.

10. The method of claim 7 wherein the through hole extends through a back wall of the brake caliper housing that faces away from a brake carrier.

11. The method of claim 7 wherein the through hole extends through a back wall of the brake caliper housing that faces away from a brake rotor, is disposed above a brake rotor axis of rotation of the brake rotor, and is disposed below an axis of rotation of a piston that actuates a brake pad assembly and a wear adjuster mechanism that is received inside the piston.

12. The method of claim 7 wherein the through hole extends through a back wall of the brake caliper housing that faces away from a brake rotor.

13. The method of claim 7 wherein the sensor is disposed on a plug that is received in the through hole.

14. The method of claim 7 wherein the through hole is disposed below an axis of rotation of a piston that actuates a brake pad assembly and a wear adjuster mechanism that is received inside the piston.

15. A method of checking sealing of a brake caliper housing, the method comprising:
   providing a sensor that is in fluid communication with a cavity of the brake caliper housing;
   determining a level of moisture in the cavity with the sensor, wherein the sensor provides a visual indication of the level of moisture; and
   visually inspecting the sensor to determine whether the level of moisture detected by the sensor exceeds a threshold amount.

16. The method of claim 15 wherein the sensor is disposed inside the cavity.

17. The method of claim 15 wherein visually inspecting the sensor includes removing the sensor from the cavity.

18. The method of claim 17 wherein removing the sensor from the cavity includes removing a plug from the brake caliper housing, the sensor being disposed on the plug.

19. The method of claim 15 wherein visually inspecting the sensor includes removing a plug from the brake caliper housing.

20. The method of claim 19 wherein the sensor is disposed inside the cavity.

* * * * *